(12) United States Patent  (10) Patent No.: US 8,286,412 B2
Kidd et al.  (45) Date of Patent: Oct. 16, 2012

(54) CROP PICK-UP ASSEMBLY

(75) Inventors: Bruce Kidd, Winnipeg (CA); Doug Rogalsky, Winnipeg (CA)

(73) Assignee: MacDon Industries Ltd, Winnipeg, Manitoba (CA)

(*) Notice: Subject to any disclaimer, the term of this patent is extended or adjusted under 35 U.S.C. 154(b) by 0 days.

(21) Appl. No.: 13/171,621

(22) Filed: Jun. 29, 2011

(65) Prior Publication Data

US 2011/0314786 A1  Dec. 29, 2011

Related U.S. Application Data

(60) Provisional application No. 61/359,637, filed on Jun. 29, 2010.

(51) Int. Cl.
  *A01D 43/02* (2006.01)
  *A01D 87/04* (2006.01)
(52) U.S. Cl. .......................................... 56/345; 56/364
(58) Field of Classification Search .................. 56/364, 56/345, 341; 15/84; 17/63
  See application file for complete search history.

(56) References Cited

U.S. PATENT DOCUMENTS

| 2,302,881 | A | * | 11/1942 | Oehler ............................ 56/364 |
| 3,236,038 | A | * | 2/1966 | Gates et al. ..................... 56/364 |
| 3,705,483 | A | * | 12/1972 | Jarrell et al. ................... 56/13.5 |
| 4,129,978 | A |  | 12/1978 | Friesen |
| 4,498,278 | A |  | 2/1985 | Friesen |
| 4,550,465 | A | * | 11/1985 | Chrisley ........................... 15/84 |
| 5,024,052 | A | * | 6/1991 | Bragg et al. ..................... 56/330 |
| 5,745,947 | A | * | 5/1998 | Liu et al. ........................... 15/84 |
| 5,848,523 | A | * | 12/1998 | Engel et al. ..................... 56/341 |
| 6,874,311 | B2 | * | 4/2005 | Lucand et al. .................. 56/341 |

* cited by examiner

*Primary Examiner* — Arpad Fabian-Kovacs
(74) *Attorney, Agent, or Firm* — Adrian D. Battison; Ade & Company Inc.

(57) ABSTRACT

A crop pick-up frame has mountings for attachment to the feeder house of a combine harvester with a pick up assembly having transverse tine bars parallel to a transverse axis which move in a composite movement both around the transverse axis and parallel to the transverse axis such that each tine describes a closed path around the transverse axis and inclined to a radial plane of the transverse axis. Behind the bars is a belt conveyor followed by a converging auger where the belt conveyor is offset to one side relative to the bars so that the ends of the bars define a first path of travel at a first end of the bars and a second path of travel at a second end of the bars and the belt conveyor is offset such that one side edge extends beyond an outermost part of the second path of travel.

2 Claims, 6 Drawing Sheets

CROP PICK-UP ASSEMBLY

This application claims the benefit under 35 USC 119 of Provisional Application 61/359637 filed Jun. 29 2010.

This invention relates to a crop pick-up apparatus for attachment to a feeder house of a combine harvester.

BACKGROUND OF THE INVENTION

U.S. Pat. Nos. 4,129,978 and 4,498,278 both by Friesen disclose a swath pick-up for a combine harvester which provides a drive for the transverse pick up bars which acts to rotate the bars about a transverse axis to sweep the crop rearwardly the feeder house of the combine while moving the bars longitudinally of the axis.

This arrangement has lead to the design and manufacture of a machine sold under the trade-mark "Rake-up" which has had a long life and is still sold in significant numbers. This is the type of pick-up with which the present invention is concerned.

However it is necessary to increase the capacity of the pick-up to match the intake requirements of the modern combine. Combine capacity is increasing and customers are demanding higher ground speeds.

The option of increasing the ground speed of the pick-up is limited by the stiffness of the bat. Also increasing the length of the bats requires an increase in stiffness of the bat. Increasing the cross-section of the bat is limited by the ability to get a low enough profile to pick the crop up off the ground efficiently.

SUMMARY OF THE INVENTION

According to one aspect of the invention there is provided a crop pick-up apparatus for attachment to a feeder house of a combine harvester comprising:

a pick-up frame including mountings arranged for attachment to the feeder house of a combine harvester;

a crop pick up assembly mounted on the frame and comprising a plurality of transverse bars extending transversely across the pick-up arranged generally around and parallel to an axis transverse to a direction of movement of the pick-up, each bar supporting a plurality of tines extending therefrom generally outwardly relative to the transverse axis;

and a drive arrangement for moving the bars in a composite movement both around the transverse axis and parallel to the transverse axis such that each tine describes a closed path around the transverse axis and inclined to a radial plane of the transverse axis;

a belt conveyor mounted on the frame behind the crop pick up assembly so as to receive the crop therefrom for transporting the crop rearwardly;

a converging auger behind the conveyor and including an auger roller with auger flights thereon so as to converge the crop inwardly from ends of the conveyor toward a discharge opening of the pick-up aligned with the feeder house for feeding the crop into the feeder house;

wherein the belt conveyor is offset to one side relative to the bars.

Preferably the ends of the bars define a first path of travel at a first end of the bars and a second path of travel at a second end of the bars and wherein the belt conveyor is offset such that one side edge extends beyond an outermost part of the second path of travel.

Preferably the frame is offset to said one side relative the mountings to the feeder house.

Preferably the auger is offset to said one side relative to the bars.

Preferably the belt conveyor has one side edge which is offset to said one side such that it projects beyond a path of travel of the end of the bars.

Preferably the ends of the bars define a first path of travel at a first end of the bars and a second path of travel at a second end of the bars and wherein the belt conveyor is offset such that a first side edge is aligned with an outermost part of the first path of travel and such that the second side edge extends beyond an outermost part of the second path of travel.

Preferably the drive arrangement includes a first drive assembly at the first end of the bars and a second drive assembly at the second end of the bars and wherein the first side edge is aligned with an inner end of the first drive assembly and the second side edge extends is aligned with an outer end of the second drive assembly.

Preferably the auger has ends aligned with the side edges of the conveyor.

In this arrangement as described in more detail hereinafter, therefore the pick-up is offset with respect to the feeder house of the combine so that the windrow feed into the combine feeder house can be optimized without making the bats longer since this will reduce the stiffness for a given cross section resulting in lower attainable ground speeds.

The swath on the ground is picked up by the tine bar type pick-up assembly and carried diagonally rearwards. The path of the tines in the top front location is diagonally rearwards, hence conveying the swath laterally. The swath material is delivered onto the rear draper deck which conveys material straight rearward underneath the header auger. Outer portions of the swath are reduced in width by the converging auger and the entire swath is then presented into combine feeder house. By offsetting the pick up bars relative to the conveyor and auger, the arrangement can more directly direct the swath towards the combine which is centrally located relative to the header.

The offsetting of the pick-up bars with respect to header removes the need to have elaborate shielding at the right hand or drive side to redirect the crop which is moving rearwardly and diagonally moving towards the left to get the material inside the right header end panel and outer end of auger. By offsetting the pick up bars, the swath material can just naturally flow diagonally rearward to the right into the auger without any need to redirect at the drive.

The previous arrangement requires deflective metal shields at the right or drive end panel to redirect the outer ends of swath moving laterally rearward back laterally in the opposite direction to contain swath inside the right header end panel. This method of deflecting crop has lots of functional issues. In addition the belt drive on the previous arrangement and the chain drive described in the U.S. Pat. No. 4,498,278 are complicated so that they are replaced by a direct drive motor.

BRIEF DESCRIPTION OF THE DRAWINGS

One embodiment of the invention will now be described in conjunction with the accompanying drawings in which.

DETAILED DESCRIPTION

Reference is firstly made to U.S. Pat. No. 4,129,978 (Friesen) issued Dec. 1978 which discloses the frame structure and mounting arrangement of a swath pick-up device of this type. It will be understood that the present invention includes a mounting arrangement and framework which can be of the type disclosed in the above patent.

Reference is firstly made to U.S. Pat. No. 4,498,278 (Friesen) issued February 1985 which discloses the drive system for the pick-up as described hereinafter.

Figure 1:
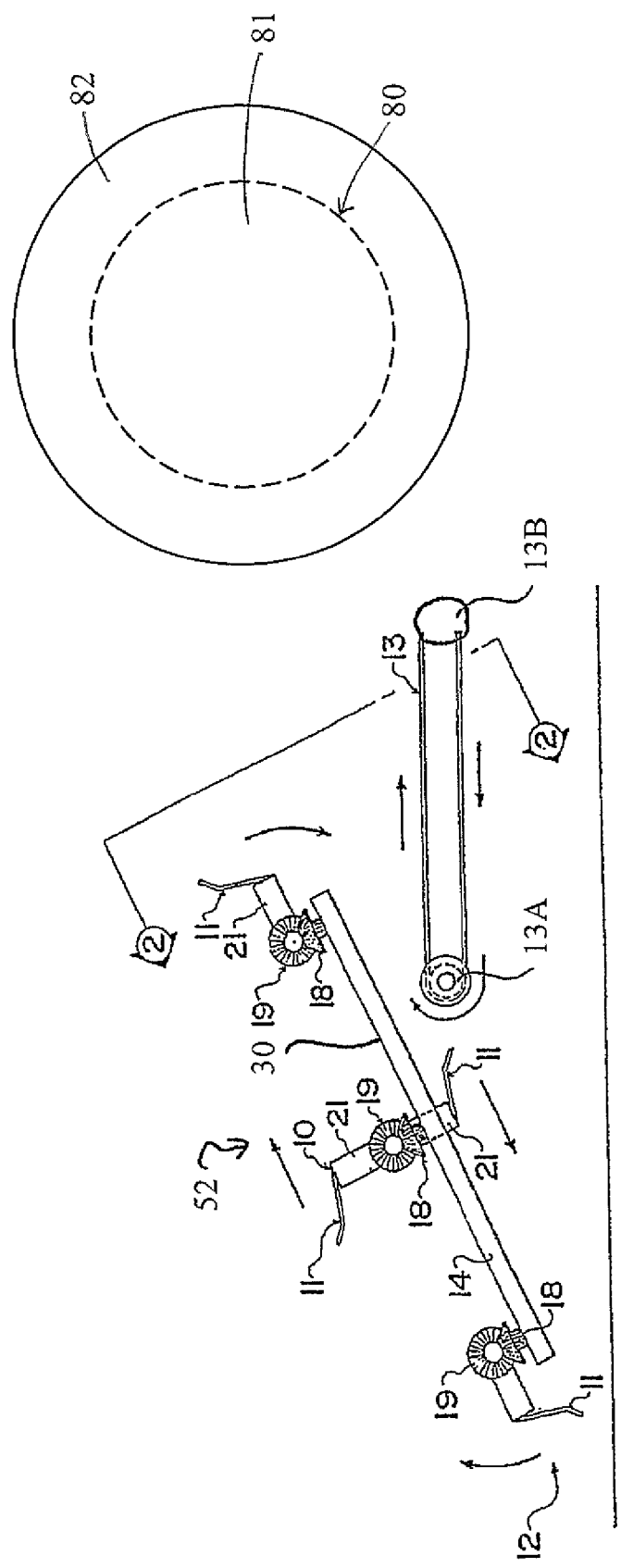
FIG. 1 is a schematic side elevational view of an embodiment of the invention.
Figure 2:
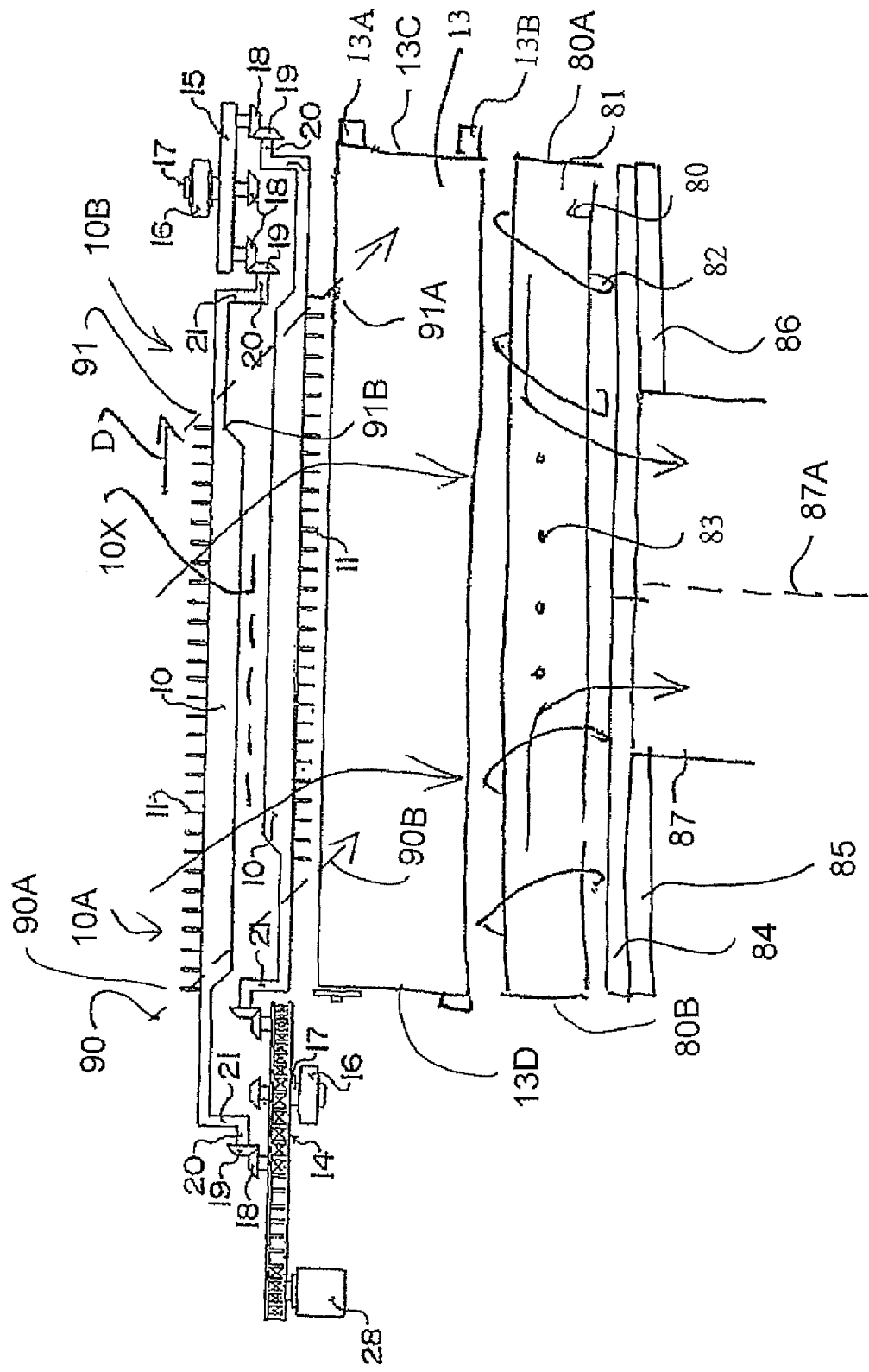
FIG. 2 is a schematic plan view of the embodiment of FIG. 1.
Figure 3:
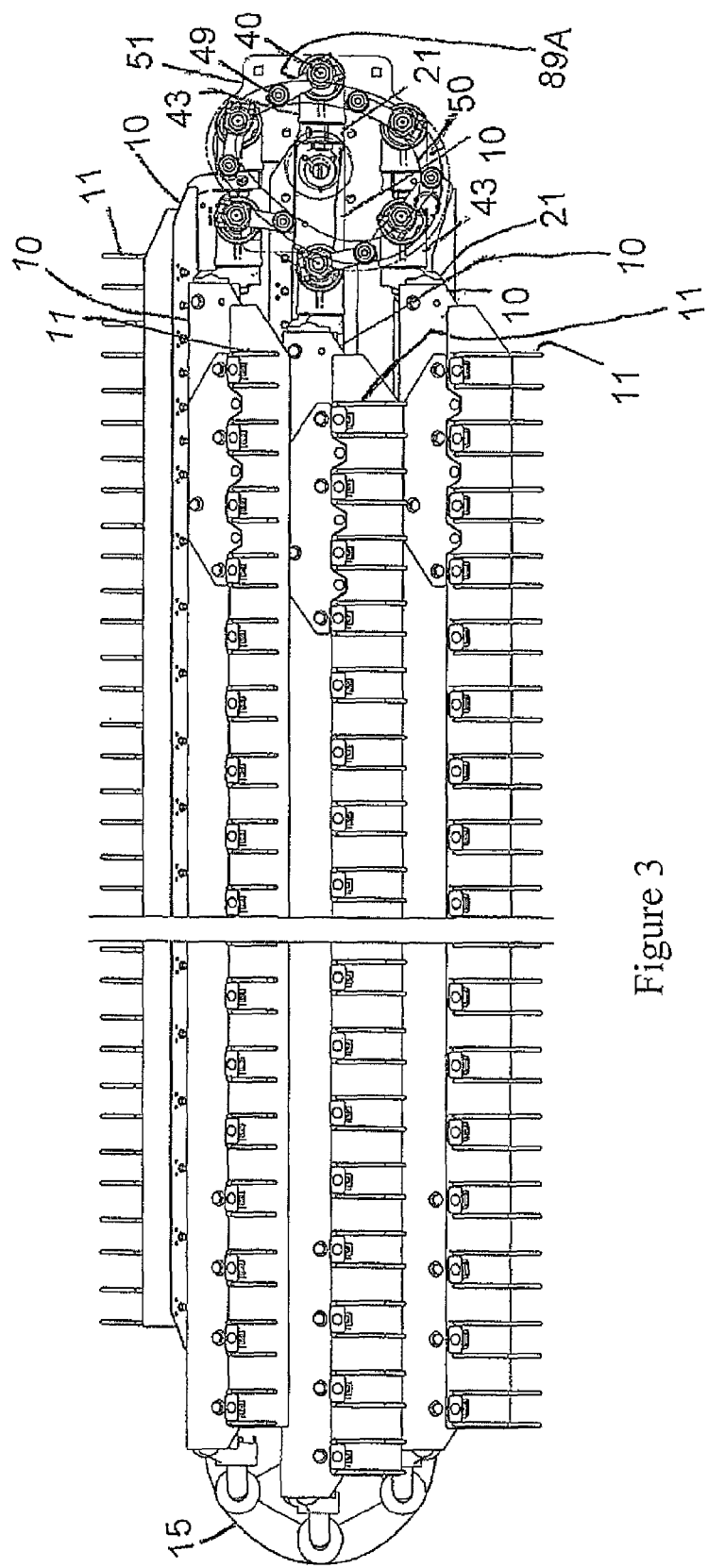
FIG. 3 is a schematic plan view of the embodiment of FIG. 1 showing more detail of the drive system and taken from U.S. Pat. No. 4,498,278 (Friesen).

Referring therefore to FIGS. 1, 2 and 3 (taken form the above patent) there is shown schematically a drive arrangement for a swath pick-up of the above type. As shown in FIG. 3 there are six transverse bars 10 supporting teeth 11 of but for convenience of illustration some of the bars 10 and the corresponding drive arrangement are omitted.

Referring FIGS. 1 and 2, the bars 10 are arranged transverse to the pick-up and extend from one side to the other side with the pick-up area lying between the drive arrangement on either side for pick-up of the swath at a nose area generally indicated at 12 for transport to a conveyor 13 mounted non a front roller 13A and a rear roller 13B. Each of the bars 10 in turn moves from the nose 12 backwardly toward the conveyor 13 around an axis 10X longitudinal of the bars and transverse to the pick-up with the teeth 11 thereof extending generally outwardly relative to the axis to carry the swath back to the conveyor 13. At the same time the bars move in a side ways direction D across the pick-up so that each tooth moves in a plane which is generally vertical and lying at an angle to the axis so as to assist in picking up crop in a swath which lies at right angles to the axis. It will be appreciated that the teeth move across the straw rather than parallel to the straw thus assisting in the pick-up.

This composite movement is provided by a drive arrangement comprising a pair of plates or discs 14, 15 mounted on shafts 17. The disk 14 at the drive end is supported on bearings in its drive motor 28 for rotation about parallel axes. As shown the axes of the plates 14, 15 lie in a substantially vertical forward plane and are inclined forwardly of the pick-up by an angle of the order of 30°. It will be appreciated that the plane of the plates in this embodiment is different from the plane of movement of the teeth but it is possible for the plates to lie substantially in any plane provided they are parallel, with the angle between the gears accommodating any variations in angle.

The plate 14 at the drive end supports around its periphery a plurality of bevel gears 18 mounted on shafts secured to the plate 14, 15. The bevel gears 18 are in meshing relationship with co-operating bevel gears 19 arranged at right angles to the gears 18 so as to be driven thereby. The gears 19 are coupled to respective shafts 20 to which the transverse members 11 are secured by a crank arm 21.

The bevel gear 18 is mounted on the upper or outer face 30 of the plate 14. The bevel gear 18 is fixed to the plate 14 so that rotation of the plate 14 about its axis causes the bevel gear 18 to rotate about its own axis.

The opposite end of the bar 10 is mounted upon the plate 15. However, the plate 15 is inverted relative to the plate 14. Also it will be noted that the bar 10 adjacent the outer most edge of the plate 14 is coupled to the plate 15 adjacent the inner most edge and vice versa.

Rotation of the plate 14 through a motor 28 connected to the shaft 17 causes the bevel gears 18 to rotate with the plate around the axis of the plate thus transporting the bars 10 in a similar motion. At the same time the movement of the bevel gears 18 relative to the axis of the plate 14 causes the bevel gears 19 to rotate thus turning the cranks 21 and causing the bars 10 to rotate about the axis of the shaft 20 of the bevel gear 19. The bevel gears 18, 19 have a corresponding number of teeth such that, as the plate 14 rotates through, for example 180°, the corresponding transverse member 10 similarly rotates through 180° relative to the shaft 20. These two extreme positions are illustrated in FIG. 2 with intermediate 90° positions also illustrated in FIG. 1. FIG. 3 shows the arrangement with six such transverse members in one location of the plate 14.

The cranks 21 provide an offset of the bars 10 relative to the shaft 20 which is sufficient to allow the bars 10 at the outer most edge of the disk to pass over the bevel gears and mounting at the inner most edge of the disk. It will be appreciated that the position of the shaft of the bevel gear 18 is constrained by the fact that the corresponding bar 10 is coupled to the other disk 15 thus retaining the bars 10 in parallel relationship lying across the pick-up. Also the bars 10 communicate rotation of the plate 14 to the plate 15 so they remain in synchronism.

Figure 4:
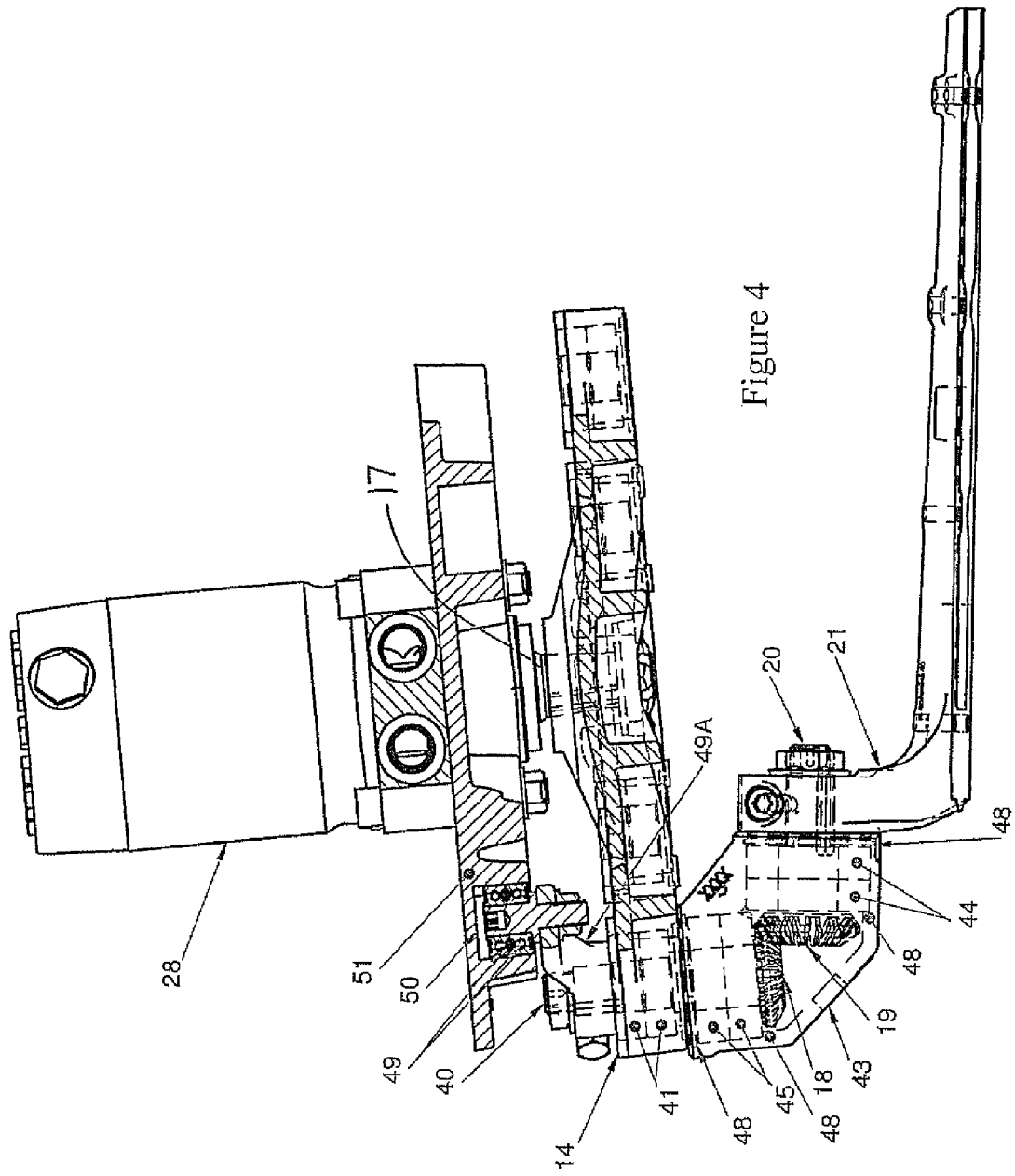
FIG. 4 is a schematic plan view of the embodiment of FIG. 1 showing more detail of the drive system and taken from U.S. Pat. No. 4,498,278 (Friesen).

Turning now to FIG. 4 there is shown in more detail a preferred arrangement of mounting for the bevel gears 18, 19 on the plate 14. The bevel gear 18 is rigidly attached to a shaft 40 mounted in bearings 41 retained by the housing 43 and a retaining ring 48. Thus the bevel gear 18 is free to rotate relative to the plate 14. The shafts 40 and 20 are mounted at right angle relationship by a mounting member 43 which comprises a hollow casing or elbow surrounding the bevel gears 18, 19 and coupled to the shafts 20, 40 by bearing blocks 44, 45 respectively. The bearing blocks 44, 45 are attached to the shafts 20, 40 and also mounted in the elbow 43 by screw threaded collars 46, 47 co-operating with shoulders 48 provided on the elbow 43. Thus the elbow 43 is free to rotate relative to the plate 14. The bar 10 is retained transverse to the pick-up by the co-operation of the plate 14 and the plate 15 and thus the elbow 43 similarly remains parallel to the axis of the pick-up. This orientation is maintained regardless of the rotation of the plate 14 with the rotation being provided by the bearings 45.

Rotation of the bevel gear 18 around its axis is provided by a cam follower 49 mounted on a crank 49A the end of the shaft 40 remote from the bevel gear 18 which co-operates with a cam track 50 provided in the cam plate 51 parallel to the plate 14. The track 50 provides a generally closed track around the plate 51 so that it will be appreciated that effectively a 360° rotation of the plate 14 causes a 360° rotation of the bevel gear 18 about its axis. Such rotation of the bevel gear 18 is communicated through bevel gear 19 to the transverse member 10 as explained previously. The cam track 50 is arranged such that the rotation of the transverse members 10 about the respective shaft 20 is controlled in a non-constant manner. Specifically the rotation is modified so that the rotation of the teeth 11 is very much delayed adjacent the front roller of the conveyor 13 so that the front roller can be arranged as close as possible to the underside of the pick-up. After the conveyor 13 and before the nose area 12 the rate of rotation is increased and then maintained constant around the nose area. Across the top part indicated generally at 52 the motion is again delayed so that the teeth remain at a substantially constant angle relative to the plate 14. Immediately after the front roller 13A of the conveyor 13 the transverse member 10 is rapidly rotated to assume the position indicated along the underside of the pick-up. The necessary shaping of the cam track 51 will be apparent to one skilled in the art and therefore is not shown in detail.

Figure 5:
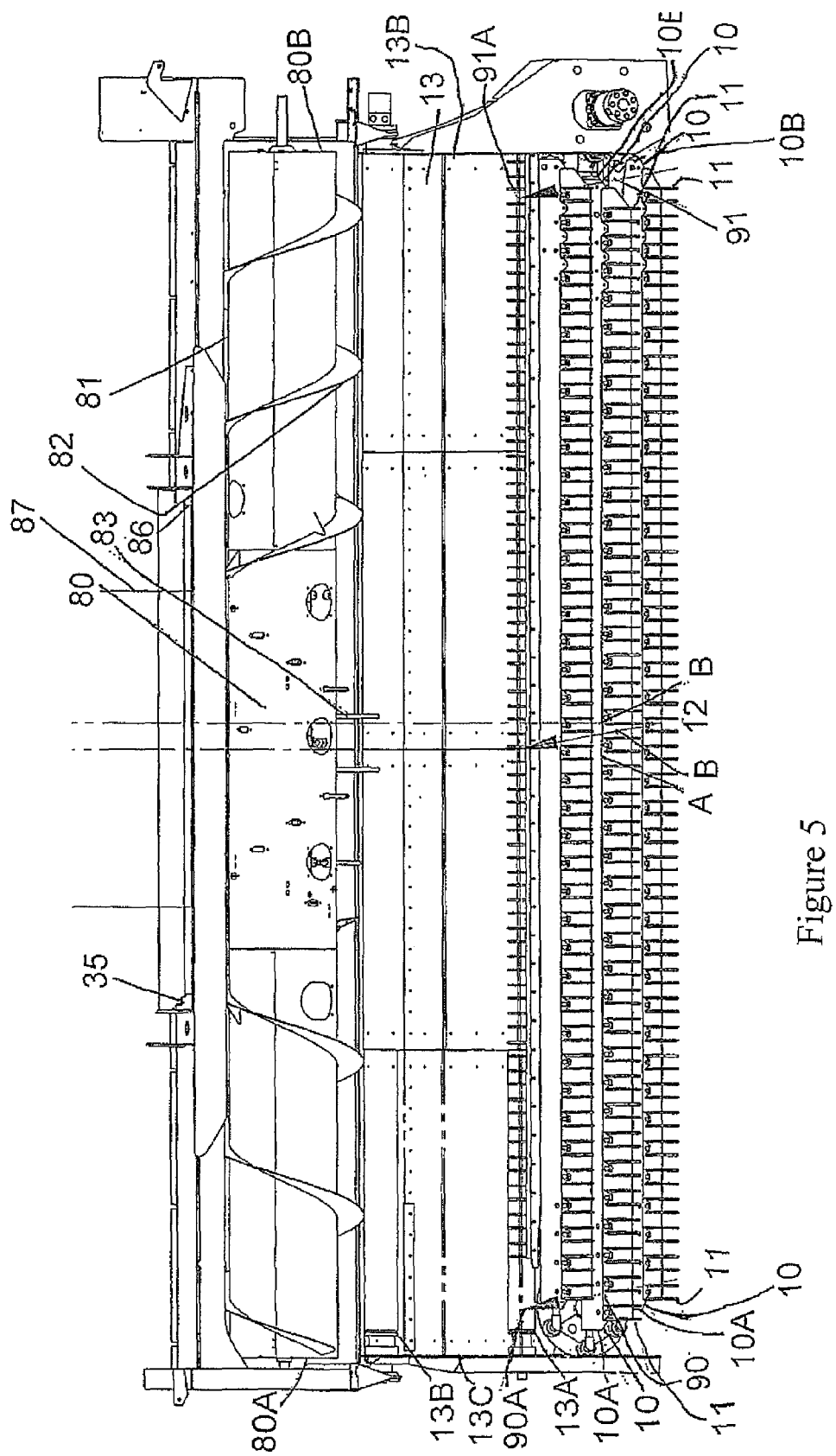
FIG. 5 is a plan view of the embodiment of FIG. 1 showing more effectively the position of the tine bars relative to the conveyor, auger and frame.
Figure 6:
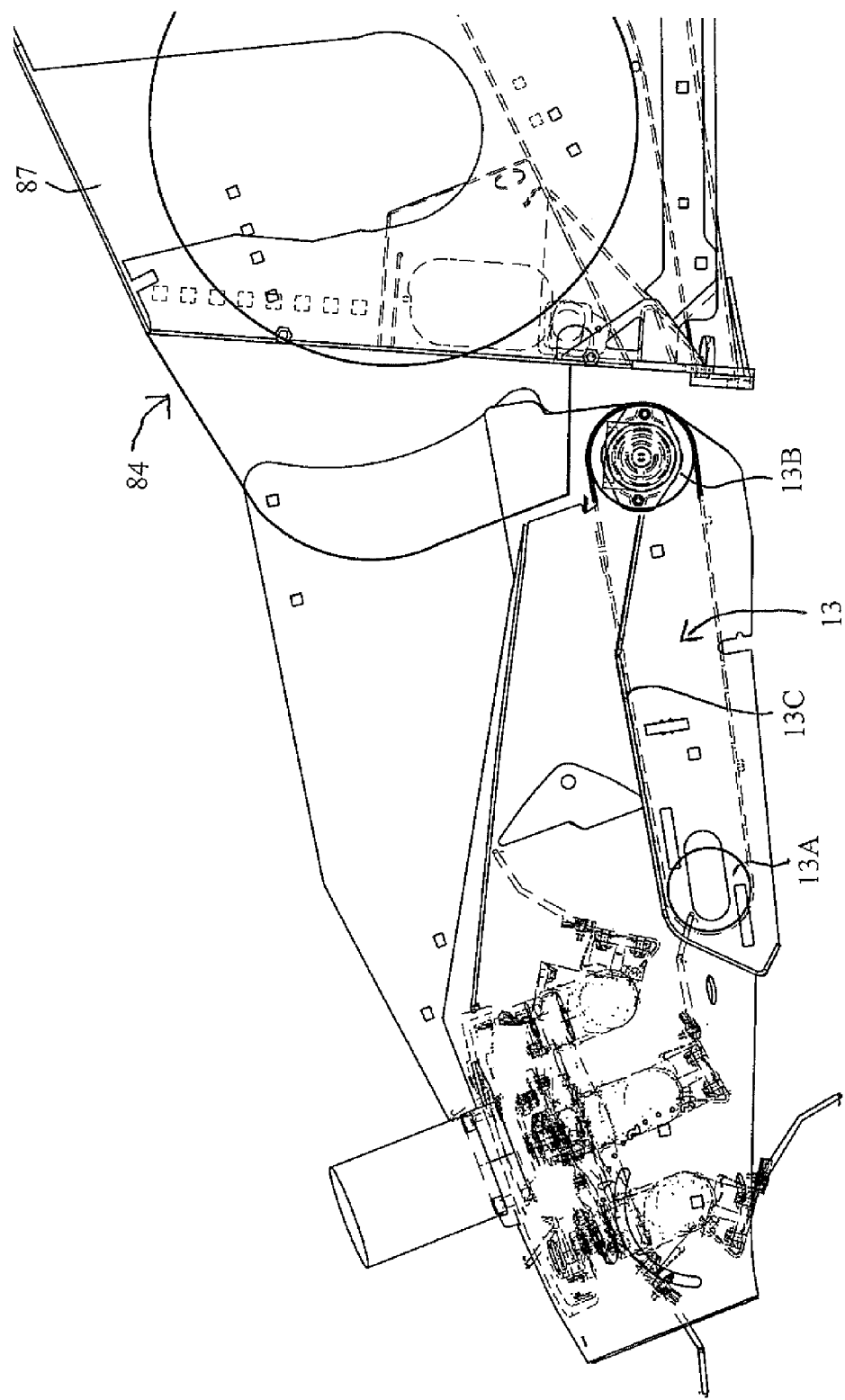
FIG. 6 is a side elevational view of the embodiment of FIG. 5. In the drawings like characters of reference indicate corresponding parts in the different figures.

FIGS. 5 and 6 show in more detail the construction of the present invention. Thus immediately behind and underneath the rear of the path of travel of the bars 10 is mounted the conveyor 13 and particularly its front roller 13A. The conveyor moves upwardly and rearwardly at a slight angle to the rear roller 13B which is larger and driven to carry the crop on a draper belt 13C of the conveyor 13.

Behind the rear roller 13B is located a feed auger 80 with a tube 81 and two auger flights 82 arranged to carry the crop inwardly toward a center section as the auger rotates to feed the crop material underneath the auger tube. At the center section is provided plurality of feed fingers 83 which carry the crop rearwardly underneath the auger and retract behind the auger tube to release the material behind the auger into a feeder house 84 of the combine harvester.

The apparatus further includes a pick-up frame 84 which includes a transverse main beam on which are connected mounting brackets 85 and 86 arranged for attachment to the feeder house 87 of a combine harvester (not shown).

The drive arrangement previously described acts to drive the bars in a composite movement D both around the transverse axis A and parallel to the transverse axis A such that each tine describes a closed path D around the transverse axis A and inclined to a radial plane P of the transverse axis.

As shown best in FIG. 1, the belt conveyor 13, which has two side edges 13C and 13D, is offset to one side 13C relative to the bars 10. Thus the ends 10A of the bars 10 define a first path 90 of travel at a first end 10A of the bars and a second path 91 of travel at a second end 10B of the bars. Thus the path 90 defines, relative to a center line 87A of the feeder house 87, an outermost end 90A of the path 90 and an innermost end 90B of the path 90 and also the path 91 defines, relative to the center line 87A of the feeder house 87 an outermost end 91A of the path 91 and an innermost end 91B of the path 91. The belt conveyor 13 is offset such that one side edge 13C extends beyond an outermost part 91A of the second path of travel 91. Also, the frame 84 including the mountings 85 and 86 to the feeder house 87 and the end 80A of the auger 80 is offset to said one side 13C relative to the bars 10. Thus the belt conveyor 13 has its one side edge 13C which is offset to said one side such that it projects beyond the second path 91 of travel of the end 10B [10A] of the bars. The other side edge 13D of the conveyor 13 and the associated end 80B of the auger are offset inwardly relative to the path 90 of the ends 10A of the bars. That is the offset of the conveyor 13 in the direction of the side edge 13C relative to the bars 10 causes, as shown in FIG. 1, the side edge 13C to be spaced outwardly relative to the path 91 to a greater extent than the side edge 13D relative to the path 90.

Thus the belt conveyor is offset such that the side edge 13D is generally aligned with an outermost part 91A of the path of travel 91 and the second side edge 13C extends outwardly of an outermost part of the path of travel 90.

The auger is also offset to the same amount so that it has ends 80A and 80B aligned with the side edges of the conveyor 13.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop pick-up apparatus for attachment to a feeder house of a combine harvester comprising:
    a pick-up frame including mountings arranged for attachment of the pick-up frame to the feeder house for movement in a direction of forward movement with the combine harvester;
    a crop pick up assembly mounted on the frame and comprising a plurality of parallel transverse bars extending transversely across the pick-up frame;
    the bars being arranged generally around and parallel to a transverse axis of the pick-up frame which axis is at right angles to the direction of forward movement;
    each bar having a first end and a second end and supporting a plurality of tines at spaced positions along the bar between the first and second ends thereof and extending therefrom generally outwardly relative to the transverse axis;
    and a drive arrangement for moving the bars in a composite movement both around the transverse axis and parallel to the transverse axis;
    the composite movement being arranged such that each tine of the bars describes a respective closed path of travel around the transverse axis, which closed path is inclined to a radial plane of the transverse axis;
    the composite movement being arranged such that the first end of the bars describes a first closed path of travel around the transverse axis, which first path is inclined to a radial plane of the transverse axis;
    the first path of travel defining an innermost end of the first path closest to the center line of the feeder house and an outermost end furthest away from the center line of the feeder house;
    the composite movement being arranged such that the second end of the bars describes a second closed path of travel around the transverse axis, which second path is inclined to a radial plane of the transverse axis;
    the second path of travel defining an innermost end of the second path closest to the center line of the feeder house and an outermost end furthest away from the center line of the feeder house;
    a belt conveyor mounted on the frame behind the crop pick up assembly so as to receive the crop therefrom for transporting the crop rearwardly, the belt conveyor having a first side edge and a second side edge;
    a converging auger behind the conveyor and including an auger roller with auger flights thereon so as to converge the crop inwardly from the first and second side edges of the belt conveyor toward a discharge opening of the pick-up frame aligned with the feeder house for feeding the crop into the feeder house;
    wherein the belt conveyor is offset to one side relative to the first and second paths of the first and second ends of the bars;
    so that the second side edge of the belt conveyor is spaced outwardly to the side relative to the second path to a greater extent than the first side edge relative to the first path;
    and so that the second side edge extends beyond the outermost end of the second path of travel.

2. The apparatus according to claim 1 wherein the auger has ends aligned with the side edges of the conveyor.

* * * * *